(12) United States Patent
Sakamoto et al.

(10) Patent No.: US 11,118,465 B2
(45) Date of Patent: Sep. 14, 2021

(54) GAS TURBINE COMBUSTOR TRANSITION PIECE INCLUDING INCLINED SURFACE AT DOWNSTREAM END PORTIONS FOR REDUCING PRESSURE FLUCTUATIONS

(71) Applicant: MITSUBISHI HITACHI POWER SYSTEMS, LTD., Kanagawa (JP)

(72) Inventors: Yasuro Sakamoto, Tokyo (JP); Satoshi Mizukami, Tokyo (JP); Keisuke Matsuyama, Tokyo (JP); Satoshi Tanimura, Kanagawa (JP); Masanori Yuri, Kanagawa (JP); Shunsuke Torii, Kanagawa (JP); Hiroaki Kishida, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 730 days.

(21) Appl. No.: 15/327,442

(22) PCT Filed: Aug. 19, 2015

(86) PCT No.: PCT/JP2015/073256
§ 371 (c)(1),
(2) Date: Jan. 19, 2017

(87) PCT Pub. No.: WO2016/027834
PCT Pub. Date: Feb. 25, 2016

(65) Prior Publication Data
US 2018/0209282 A1 Jul. 26, 2018

(30) Foreign Application Priority Data
Aug. 19, 2014 (JP) ................................ 2014-166922

(51) Int. Cl.
*F01D 9/02* (2006.01)
*F23R 3/46* (2006.01)
*F23R 3/42* (2006.01)

(52) U.S. Cl.
CPC ................ *F01D 9/023* (2013.01); *F23R 3/42* (2013.01); *F23R 3/46* (2013.01)

(58) Field of Classification Search
CPC . F01D 9/023; F01D 9/041; F23R 3/46; F05D 2220/3212; F05D 2240/35
See application file for complete search history.

(56) References Cited

U.S. PATENT DOCUMENTS 4,422,288 A * 12/1983 Steber .................... F01D 9/023
60/39.37
9,091,170 B2 * 7/2015 Sakamoto ............... F01D 5/186
(Continued)

FOREIGN PATENT DOCUMENTS

CN 1463321 12/2003
CN 101784842 7/2010
(Continued)

OTHER PUBLICATIONS

International Search Report dated Nov. 17, 2015 in International (PCT) Application No. PCT/JP2015/073256.
(Continued)

*Primary Examiner* — William H Rodriguez
(74) *Attorney, Agent, or Firm* — Wenderoth, Lind & Ponack, L.L.P.

(57) ABSTRACT

A gas turbine combustor and a gas turbine; wherein inclined surfaces are provided on inner surfaces of side walls neighboring in a circumferential direction at downstream end portions of transition pieces of combustors, the inclined surfaces being configured to increase a passage area of the transition pieces, a ratio (S/P) is from 0 to 0.2, where (P) is (Continued)

a pitch dimension of first stage vanes, and (S) is a circumferential dimension from an intermediate point between neighboring transition pieces to an upstream end of a first stage vane closest in the circumferential direction; and a ratio (L/P) is from 0.3 to 0.55, where (P) is the pitch dimension, and (L) is an axial dimension from a downstream end of the transition piece to the upstream end of the first stage vane.

6 Claims, 12 Drawing Sheets

(56) References Cited

U.S. PATENT DOCUMENTS

| | | | |
|---|---|---|---|
| 9,395,085 B2* | 7/2016 | Budmir | F01D 9/023 |
| 2004/0022622 A1 | 2/2004 | Magoshi | |
| 2004/0060298 A1 | 4/2004 | Han et al. | |
| 2010/0251687 A1* | 10/2010 | Zborovsky | F01D 9/023 |
| | | | 60/39.37 |
| 2010/0313567 A1* | 12/2010 | Nakamura | F01D 9/023 |
| | | | 60/722 |
| 2011/0123351 A1 | 5/2011 | Hada et al. | |
| 2012/0216542 A1* | 8/2012 | Siden | F23R 3/46 |
| | | | 60/772 |
| 2013/0291548 A1* | 11/2013 | Ingram | F02C 9/16 |
| | | | 60/772 |
| 2014/0130511 A1 | 5/2014 | Nakamura et al. | |
| 2014/0216055 A1* | 8/2014 | Sakamoto | F23R 3/283 |
| | | | 60/796 |

FOREIGN PATENT DOCUMENTS

| | | |
|---|---|---|
| CN | 101946063 | 1/2011 |
| CN | 102224322 | 10/2011 |
| CN | 103782103 | 3/2014 |
| EP | 1 903 184 | 3/2008 |
| JP | 2001-289003 | 10/2001 |
| JP | 2004-116992 | 4/2004 |
| JP | 2006-52910 | 2/2006 |
| JP | 2008-111652 | 5/2008 |
| JP | 2009-197650 | 9/2009 |
| JP | 2013-64535 | 4/2013 |

OTHER PUBLICATIONS

Written Opinion of the International Searching Authority dated Nov. 17, 2015 in corresponding International (PCT) Application No. PCT/JP2015/073256.
Office Action dated Jun. 13, 2018 in Chinese Patent Application No. 201580040420.5, with Machine Translation.

* cited by examiner

GAS TURBINE COMBUSTOR TRANSITION PIECE INCLUDING INCLINED SURFACE AT DOWNSTREAM END PORTIONS FOR REDUCING PRESSURE FLUCTUATIONS

TECHNICAL FIELD

The present invention relates to a gas turbine which obtains rotational power by fuel being supplied to compressed high-temperature, high-pressure air, the air and fuel being combusted, and the resultant combustion gas being supplied to a turbine.

BACKGROUND ART

A gas turbine is constituted by a compressor, a combustor, and a turbine. Air taken in through an air inlet port is compressed by the compressor to produce high-temperature, high-pressure compressed air. Fuel is supplied to this compressed air and the two are combusted in the combustor. The resultant high-temperature, high-pressure combustion gas is used to drive the turbine, which in turn drives a generator coupled thereto. In this configuration, the turbine includes a casing in which a plurality of vanes and blades are alternately disposed. When the blades are driven by the combustion gas, the output shaft coupled to the generator is driven in rotation. The combustion gas that has driven the turbine is released to the atmosphere as exhaust gas.

In such a gas turbine, a plurality of combustors are disposed neighboring one another in the circumferential direction. The combustion gas combusted at each combustor flows out through a transition piece and enters a flow channel from a gas inlet of the turbine. Immediately after the combustion gas flows out of the transition piece, a Karman vortex street may formed in the flow between side flanges of neighboring transition pieces. Unsteady pressure fluctuations of which this Karman vortex street is the vibration source may resonate at an acoustic eigenvalue, and a large pressure fluctuation may occur leading to cessation of operations.

An example of technology with an object of resolving such a problem is described in Japanese Unexamined Patent Application Publication No. 2013-064535A (JP 2013-064535A). The gas turbine described in JP 2013-064535A includes inner surfaces of lateral walls facing each other in the circumferential direction on the downstream portion of a transition piece. The inner surfaces have an inclined surface that inclines in a direction that gradually approaches an adjacent transition piece as it goes to the downstream side of the transition piece in an axis direction.

In the conventional gas turbine described above, the lateral wall inner surfaces on the downstream side of the transition piece have inclined surfaces. This allows flow along the lateral wall inner surfaces to merge and thus prevent a Karman vortex street from forming. However, the combustion gas that enters into the combustion gas flow channel from the transition pieces of the combustors interferes with a first stage vane of the turbine. As a result, deviation in the flow rate of the combustion gas may occur between that of the plurality of combustors neighboring in the circumferential direction. When a deviation occurs across the flow rate of the combustion gas from the plurality of combustors, a temperature difference (temperature non-uniformity) across the combustors occurs, leading to problems such as an increase in nitrogen oxide (NOx) emissions and a decrease in turbine efficiency.

SUMMARY OF THE INVENTION

To resolve the problems described above, an object of the present invention is to provide a gas turbine able to suppress an increase in NOx emissions and a decrease in turbine efficiency by preventing a Karman vortex street from forming between the combustors and suppressing a difference in flow rates of combustion gas across the combustors.

To achieve the above-described object, a gas turbine of the present invention includes a compressor configured to compress air, a plurality of combustors disposed in an annular configuration about a rotor, each of the combustors being configured to combust a mixture of compressed air compressed by the compressor and fuel, and a turbine configured to obtain rotational power from combustion gas produced by the combustors. Inclined surfaces are provided on inner surfaces of side walls neighboring in a circumferential direction at downstream end portions of transition pieces of the combustors, the inclined surfaces being configured to increase a passage area of the transition pieces. A ratio S/P is from 0 to 0.2, where P is a pitch dimension of first stage vanes of the turbine, and S is a circumferential dimension from an intermediate point between neighboring transition pieces of the transition pieces to an upstream end of a first stage vane of the first stage vanes closest in the circumferential direction; and a ratio L/P is from 0.3 to 0.55, where P is the pitch dimension, and L is an axial dimension from a downstream end of the transition piece to the upstream end of the first stage vane.

With this configuration, the positional relationship between the transition pieces and the first stage vanes is made suitable. This allows for pressure fluctuation at the rear end portions of the transition pieces of the plurality of combustors caused by a Karman vortex street to be suppressed and also for a difference in flow rate of the combustion gas across the plurality of combustors to be suppressed. As a result, by preventing a major Karman vortex street from forming, pressure fluctuation at downstream portions of the transition pieces can be suppressed. Additionally, by suppressing a difference in flow rate of combustion gas across the combustors, increases in NOx emissions and decreases in turbine efficiency can be suppressed.

The gas turbine according to the present invention may also have a configuration wherein the ratio S/P of the circumferential dimension S to the pitch dimension P is from 0.05 to 0.15, and the ratio L/P of the axial dimension L to the pitch dimension P is from 0.3 to 0.4.

With this configuration, the positional relationship between the transition pieces and the first stage vanes is made suitable. This allows for a major Karman vortex street at the rear end portions of the transition pieces of the plurality of combustors to be prevented and also for a difference in flow rate of the combustion gas across the plurality of combustors to be suppressed.

The gas turbine according to the present invention may also have a configuration wherein a ratio between the number of combustors and the number of first stage vanes of the turbine is 2:3 or greater odd number.

The gas turbine according to the present invention may also have a configuration wherein the inclined surface is provided at a downstream portion of the transition piece on an inner surface of at least one side wall of a pair of side walls disposed in opposition with respect to the circumferential direction of the rotor, the inclined surface inclining toward a neighboring transition piece as it extends downstream in an axial direction of the transition piece to the downstream end of the transition piece.

With this configuration, flow along the side wall inner surfaces of neighboring transition pieces merge at an angle downstream of the downstream end surfaces of the transition pieces. Thus, a major Karman vortex street can be prevented from forming downstream of the downstream end surfaces of the transition pieces, and thus pressure fluctuation at the downstream portions of the transition pieces can be suppressed.

The gas turbine according to the present invention may also have a configuration wherein positions of the upstream ends of the first stage vanes are located aligned in a radial direction about the rotor.

With this configuration in which positions of the upstream ends of the first stage vanes are located aligned in a radial direction about the rotor, the positional relationship between the transition pieces and the first stage vanes is made suitable in all regions in the longitudinal direction of the first stage vanes. This allows for pressure fluctuation at the rear end portions of the transition pieces of the plurality of combustors caused by a Karman vortex street to be suppressed and also for a difference in flow rate of the combustion gas across the plurality of combustors to be suppressed.

The gas turbine according to the present invention may also have a configuration wherein a throat width between first stage vanes neighboring in the circumferential direction of the plurality of first stage vanes is greater at one end and/or another end in the radial direction of the rotor than at an intermediate portion in the radial direction.

By setting the throat width of the first stage vanes at either end portion to be greater than that at the intermediate portion, turbine efficiency is increased, enabling an increase in performance.

The gas turbine according to the present invention may also have a configuration wherein the ratio L/P is set taking into account an amount of cooling air for a shroud which supports the first stage vanes and turbine efficiency.

By setting the ratio L/P on the basis of the amount of cooling air for the shroud and turbine efficiency, the positional relationship between the transition pieces and the first stage vanes can be made suitable.

The gas turbine according to the present invention may also have a configuration wherein upstream ends of the first stage vanes are disposed to have a positional relationship such that a line that joins the upstream ends in the radial direction of the rotor curves.

Advantageous Effects of the Invention

According to the gas turbine of the present invention, the positional relationship between the transition pieces and the first stage vanes is made suitable. This allows for a major Karman vortex street at the rear end portions of the transition pieces of the plurality of combustors to be prevented and also for a difference in flow rate of the combustion gas across the plurality of combustors to be suppressed. As a result, increases in NOx emissions and decreases in turbine efficiency can be suppressed.

DESCRIPTION OF EMBODIMENTS

Preferred embodiments of a gas turbine according to the present invention are described in detail below with reference to the attached drawings. However, the present invention is not limited by these embodiments, and, when there are a plurality of embodiments, encompasses combinations of these various embodiments.

Figure 1:
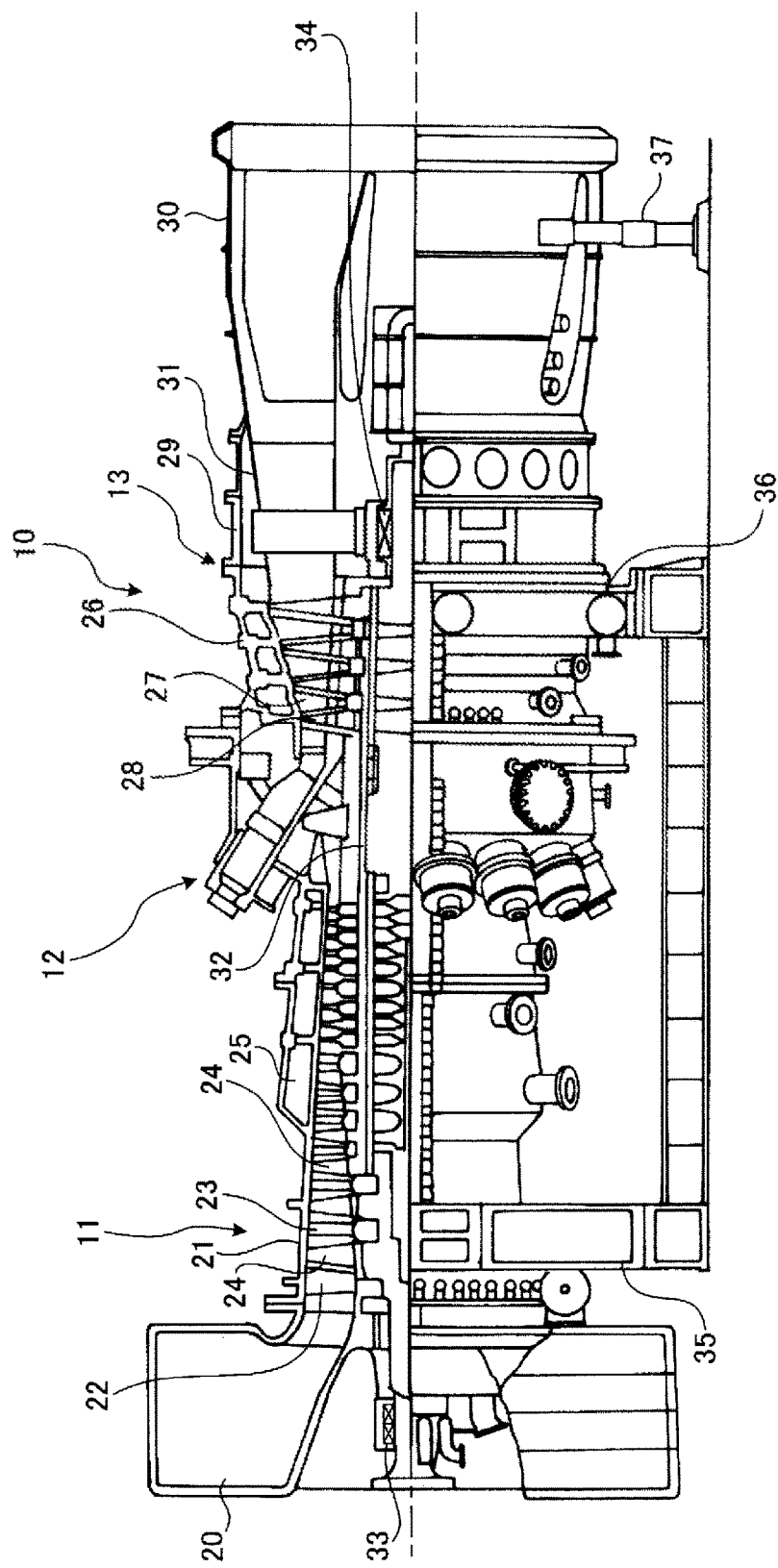
FIG. 1 is a schematic configuration diagram of a gas turbine of the present embodiment.
Figure 2:
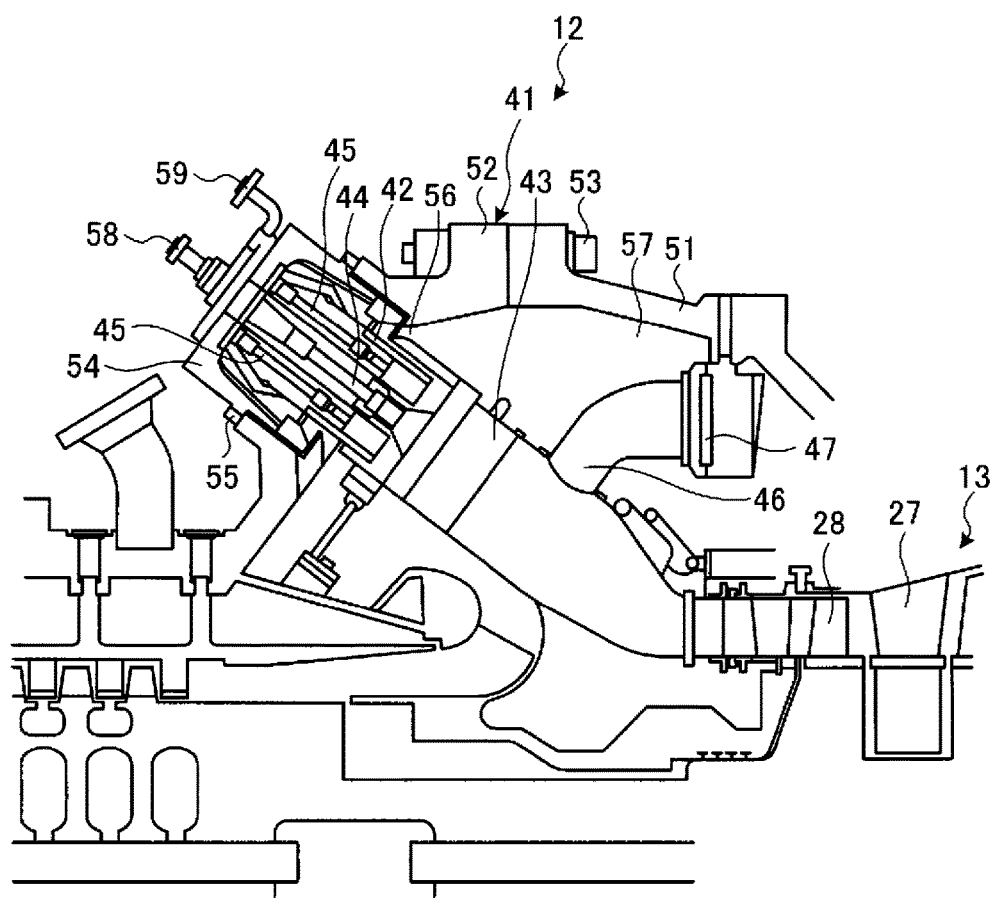
FIG. 2 is a schematic configuration diagram of a combustor of the gas turbine.

FIG. 1 is a schematic configuration diagram of a gas turbine of the present embodiment. FIG. 2 is a schematic configuration diagram of a combustor of the gas turbine.

In the present embodiment, as illustrated in FIG. 1, the gas turbine 10 includes a compressor 11, the combustor (gas turbine combustor) 12, and a turbine 13. The gas turbine 10 is coaxially coupled to a generator not illustrated in the drawings, and is capable of generating power.

The compressor 11 includes an air inlet port 20 for taking in air, an inlet guide vane (IGV) 22 disposed inside a compressor casing 21, a plurality of vanes 23 and blades 24 alternately disposed with respect to the forward/backward direction (the axial direction of a rotor 32 described below) within the compressor casing 21, and an air bleed chamber 25 disposed on the outside of the compressor casing 21. The combustor 12 supplies fuel to compressed air compressed by the compressor 11, and ignites the mixture to allow for combustion. The turbine 13 includes a plurality of vanes 27 and blades 28 alternately disposed with respect to the forward/backward direction (the axial direction of the rotor 32 described below) within a turbine casing 26. An exhaust chamber 30 is disposed on the downstream side of the turbine casing 26 mediated by an exhaust casing 29, and the exhaust chamber 30 includes an exhaust diffuser 31 connected to the turbine 13.

A rotor (rotating shaft) 32 is disposed passing through the centers of the compressor 11, the combustor 12, the turbine 13, and the exhaust chamber 30. The end of the rotor 32 by the compressor 11 is rotatably supported by a bearing portion 33, and the end portion of the rotor 32 by the exhaust chamber 30 is rotatably supported by a bearing portion 34. An array of discs on which the blades 24 are mounted is anchored to the rotor 32 in the compressor 11, and an array of discs on which the blades 28 are mounted is anchored to the rotor 32 in the turbine 13.

The gas turbine 10 is supported by a leg portion 35 under the compressor casing 21 of the compressor 11, by a leg portion 36 under the turbine casing 26 of the turbine 13, and by a leg portion 37 under the exhaust chamber 30.

Accordingly, air taken in through the air inlet port 20 of the compressor 11 passes through the inlet guide vane 22 and the plurality of vanes 23 and blades 24 and is compressed, and the air is converted to high-temperature, high-pressure compressed air. A predetermined fuel is supplied to the compressed air in the combustor 12, and combusted. In the turbine 13, the high-temperature, high-pressure combustion gas, i.e. working fluid, produced by the combustor 12 passes through the plurality of vanes 27 and blades 28, and the rotor 32 is driven in rotation. This in turn drives the generator coupled to the rotor 32. The combustion gas passes through the exhaust diffuser 31 of the exhaust chamber 30 and is released to the atmosphere as exhaust gas.

The combustor 12, as illustrated in FIG. 2, includes an outer cylinder 41. On the inner side of the outer cylinder 41, a plurality of inner cylinders 42 are disposed at predetermined intervals. A combustor casing is configured with a transition piece 43 being coupled to the inner cylinder 42 at the front end portion of each inner cylinder 42. The outer cylinder 41, the inner cylinders 42, and the transition pieces 43 are disposed around the main axis. A pilot burner 44 is centrally disposed inside the inner cylinder 42, and a plurality of main burners 45 are disposed on the inner peripheral surface of the inner cylinder 42 in the circumferential direction and surround the pilot burner 44. The pilot burner 44 and the main burners 45 are parallel to one another, and are disposed around the main axis. The transition piece 43 is coupled to a bypass pipe 46 which includes a bypass valve 47.

The outer cylinder 41 includes an outer cylinder body 51 and an outer cylinder cover portion 52 attached firmly to the base end portion of the outer cylinder body 51. The two are fastened by a plurality of fastening bolts 53. The outer cylinder 41 includes a top hat portion 54 fitted to the inner side of the outer cylinder cover portion 52, the two being fastened together by a plurality of fastening bolts 55. The inner cylinders 42 are disposed on the inner side of the outer cylinder 41 at predetermined intervals. A cylindrical air passage 56 is defined between the inner surface of the top hat portion 54 and the outer surface of the inner cylinder 42. Additionally, the air passage 56 at one end portion connects to a supply passage 57 for air compressed by the compressor 11, and at the other end portion connects the side of the inner cylinder 42 by the base end portion.

The pilot burner 44 is centrally disposed in the inner cylinder 42, and the plurality of main burners 45 are disposed surrounding the pilot burner 44. Additionally, the top hat portion 54 is provided with fuel ports 58, 59. A pilot fuel line, not illustrated, connects to the pilot fuel port 58, and a main fuel line connects to each of the main fuel ports 59.

Figure 3:
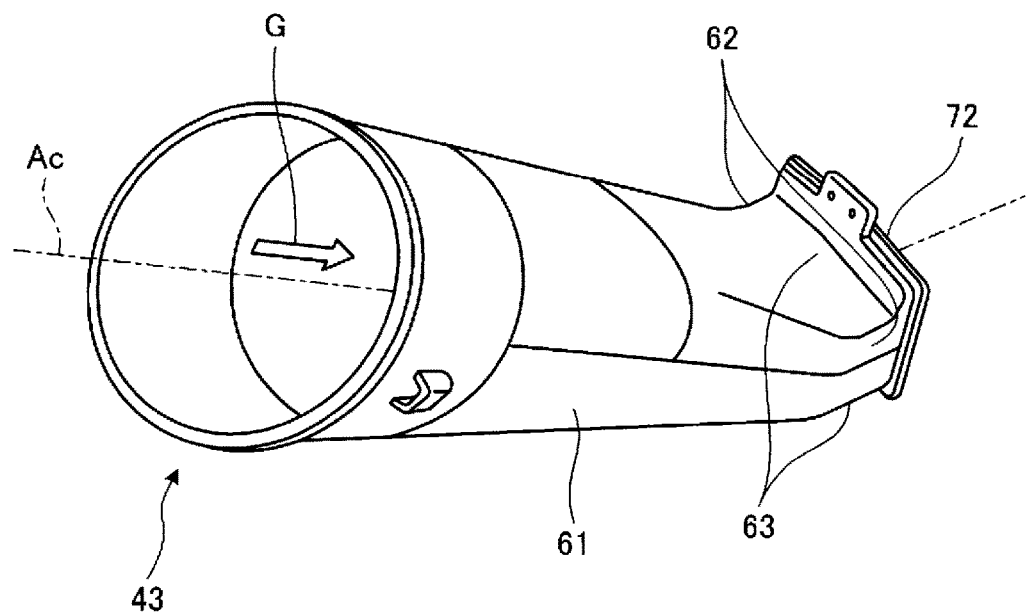
FIG. 3 is a perspective view of a combustor transition piece.
Figure 3:
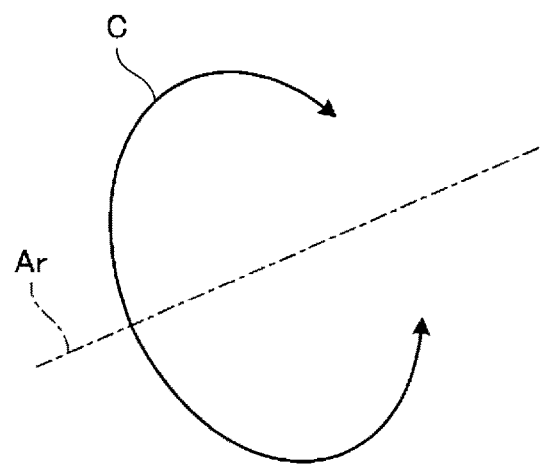
Figure 4:
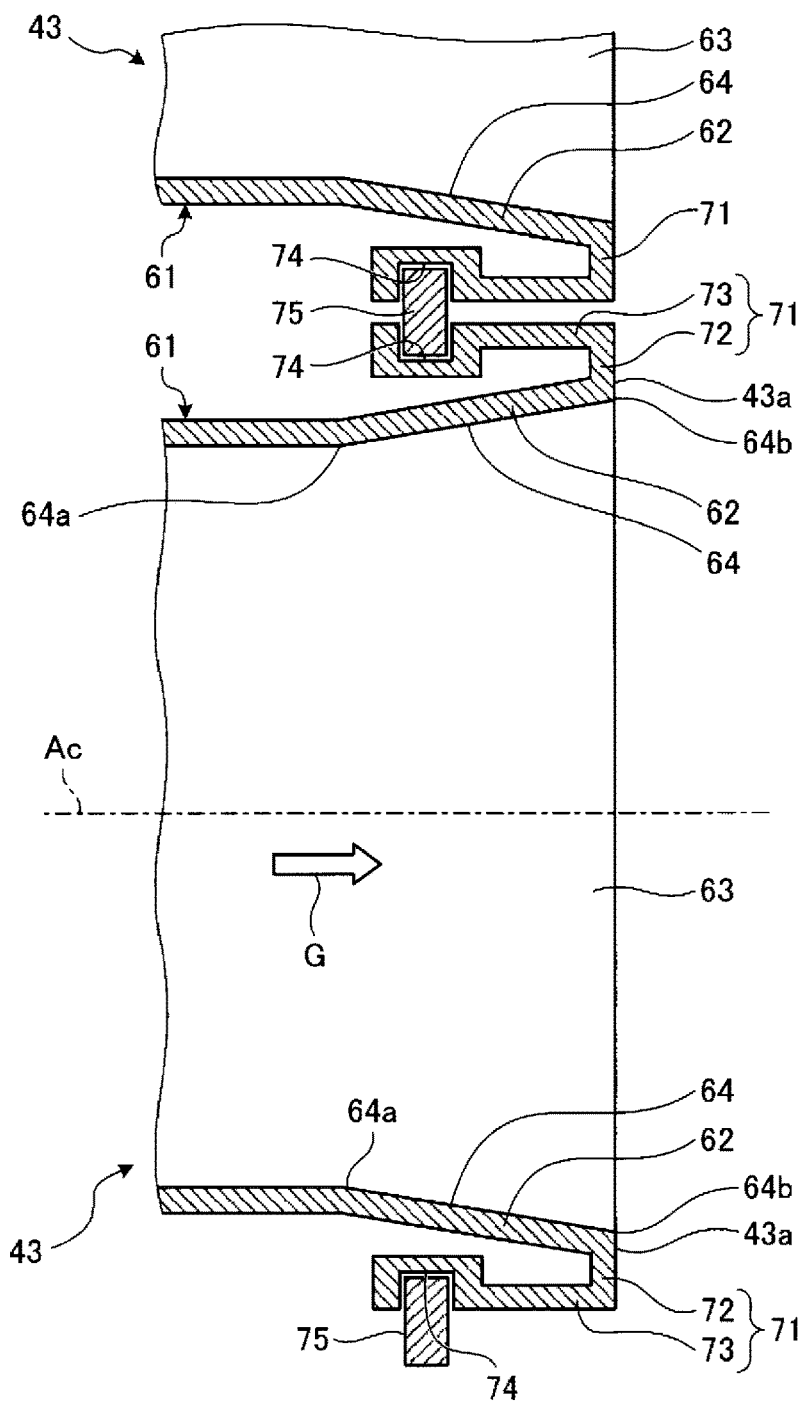
FIG. 4 is a cross-sectional view of the combustor transition piece.

Below, the transition piece 43 of the combustor 12 is described in detail. FIG. 3 is a perspective view of the combustor transition piece. FIG. 4 is a cross-sectional view of the combustor transition piece.

The transition piece 43, as illustrated in FIGS. 3 and 4, includes a tubular trunk 61 through which combustion gas G flows, and an outlet flange 71 that widens in a direction away from the axis Ac of the transition piece 43 and is provided on a downstream end portion of the trunk 61. The downstream side of the trunk 61 has a rectangular cross section. On the downstream side of the trunk 61, the trunk 61 includes a pair of side walls 62 disposed in opposition in the circumferential direction C about the rotational axis Ar of the rotor 32, and a pair of side walls 63 disposed radially in opposition about the rotational axis Ar.

The outlet flange 71 includes a flange main portion 72 that widens in a direction away from the axis Ac of the transition piece 43 starting at the downstream end of the trunk 61, and an opposing portion 73 that extends upstream from the outer edge of the flange main portion 72. The downstream end surface of the flange main portion 72 corresponds to the downstream end surface 43a of the transition piece 43. Additionally, in between the opposing portion 73 of the outlet flange 71 and the opposing portion 73 of the transition piece 43 neighboring in the circumferential direction C, a seal member 75 is provided for sealing the space between the transition pieces of neighboring combustors 12. The seal member 75 is fitted into a recessed portion 74 formed on each opposing portion 73. Note that in the present embodiment, the downstream portion of the trunk 61, i.e. the downstream side walls 62, 63 of the trunk 61, and the flange main portion 72 of the outlet flange 71 are integrally formed.

The inner surfaces of the pair of side walls 62 of the trunks 61 disposed in opposition with respect to the circumferential direction C are each provided with an inclined surface 64 that inclines towards a neighboring transition piece 43 as it extends downstream in the direction of the axis Ac of the transition piece 43 to a downstream end 64b of the transition piece 43. In other words, the inclined surface 64 is the inner surface of the side wall 62 from the upstream end 64a to the downstream end 64b of the transition piece 43.

The combustion gas G that flows downstream through the transition piece 43 flows in the direction aligned with the inner surfaces of the side walls 62 after flowing out from the transition piece 43. Thus, a Karman vortex street may form downstream of the downstream end surface 43a of the flange main portion 72. In the present embodiment, the inner surfaces of the downstream side walls 62 of the transition piece 43 are formed as the inclined surfaces 64. Thus, the angle made by the downstream end portion 43a of the flange main portion 72 with respect to the inner surface of the side wall 62 is smaller than configurations without the inclined surfaces 64. Accordingly, a Karman vortex street can be prevented from forming downstream of the downstream end surface 43a of the flange main portion 72, and thus pressure fluctuation at the downstream portion of the transition piece 43 can be suppressed.

Note that the inclined surface 64 of the transition piece 43 is not limited to the shape described above. For example, the inclined surface 64 may be an overall planar shape from the upstream end 64a to the downstream end 64b. In other words, the inclined surface 64 is not required to be completely planar and may have at least a portion with a curved surface.

Figure 5:
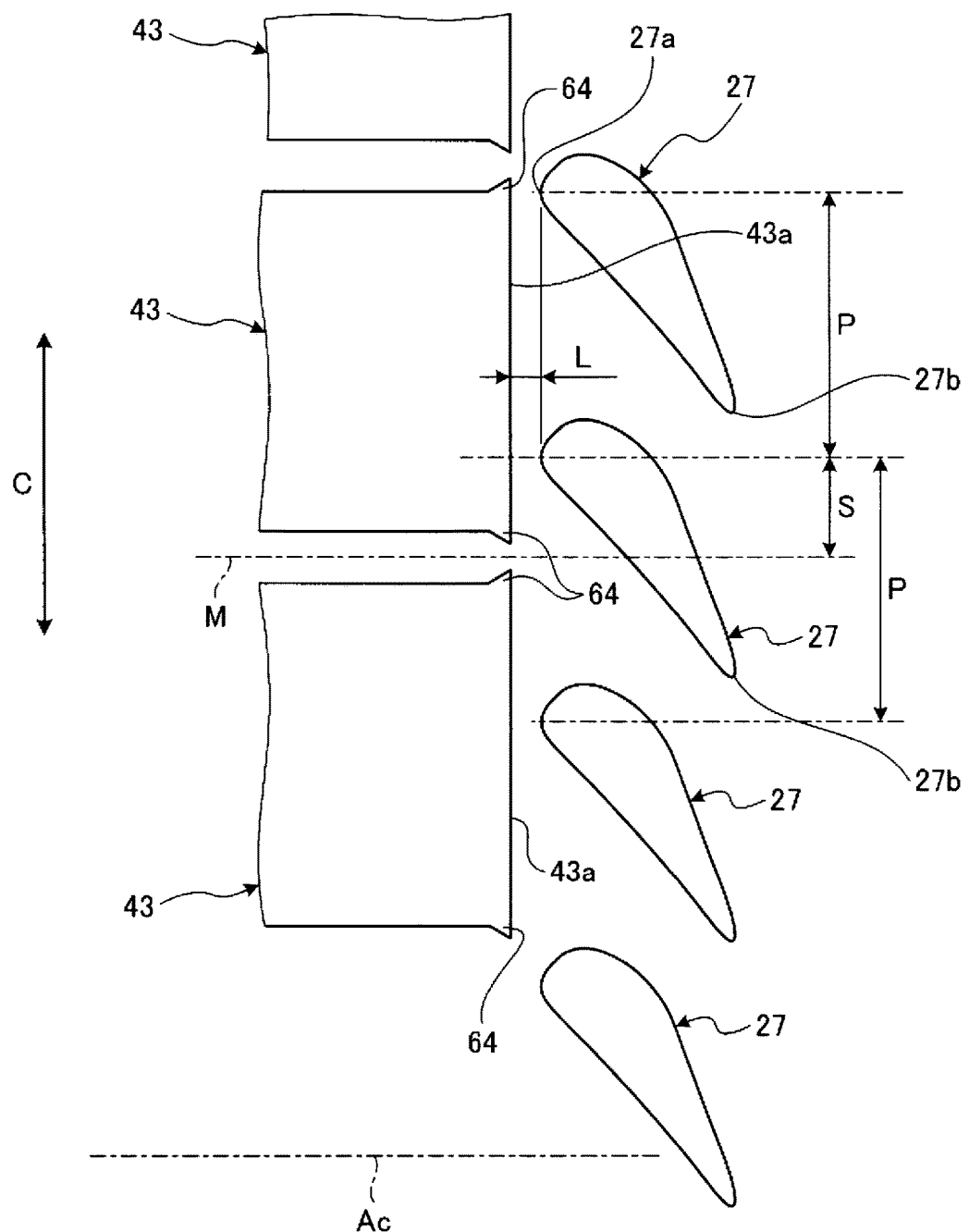
FIG. 5 is a schematic diagram of the positional relationship between the combustor transition pieces and first stage vanes as seen from the side of the combustor.
Figure 6:
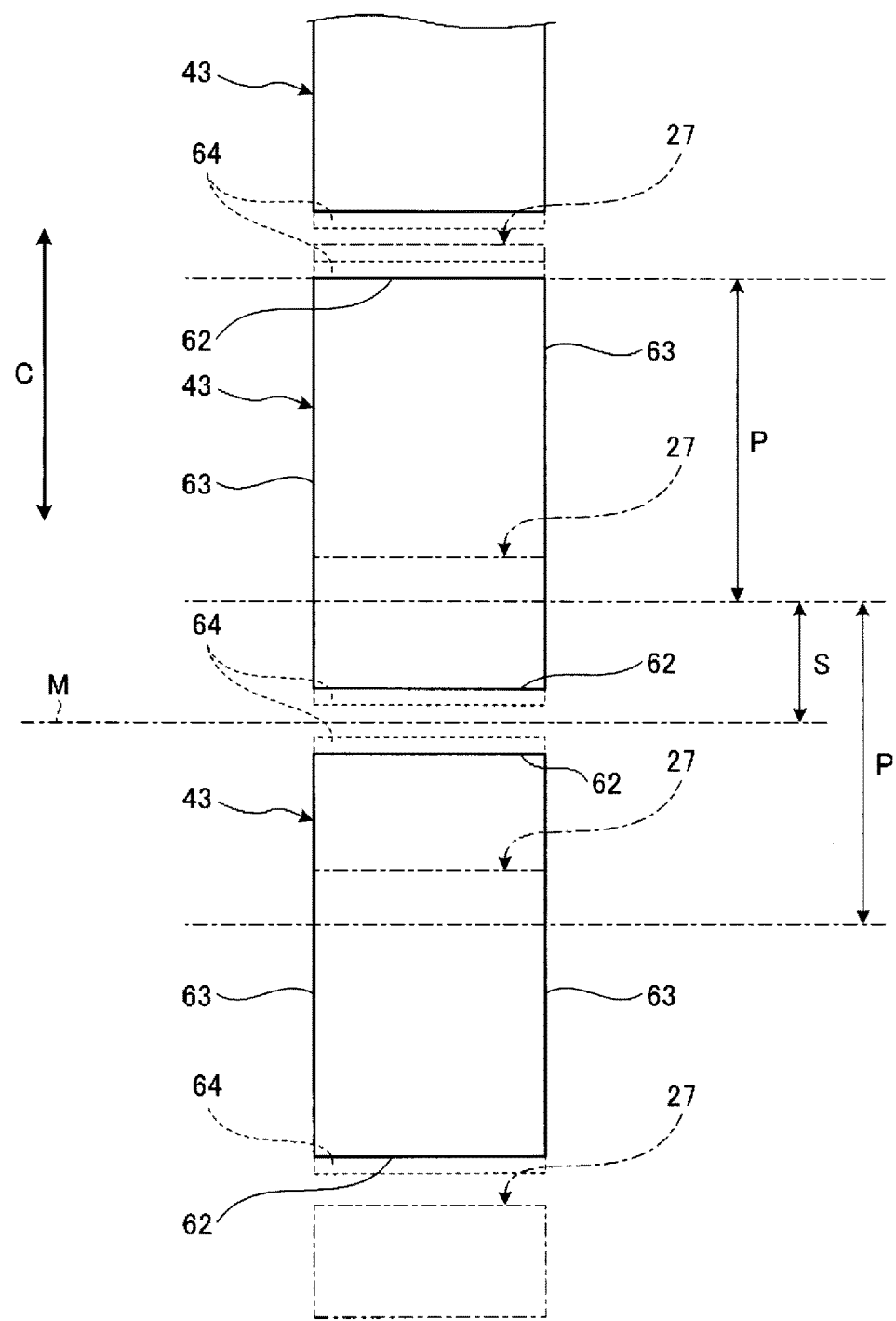
FIG. 6 is a schematic diagram of the positional relationship between the combustor transition pieces and the first stage vanes as seen from the upstream side of the combustor.
Figure 7:
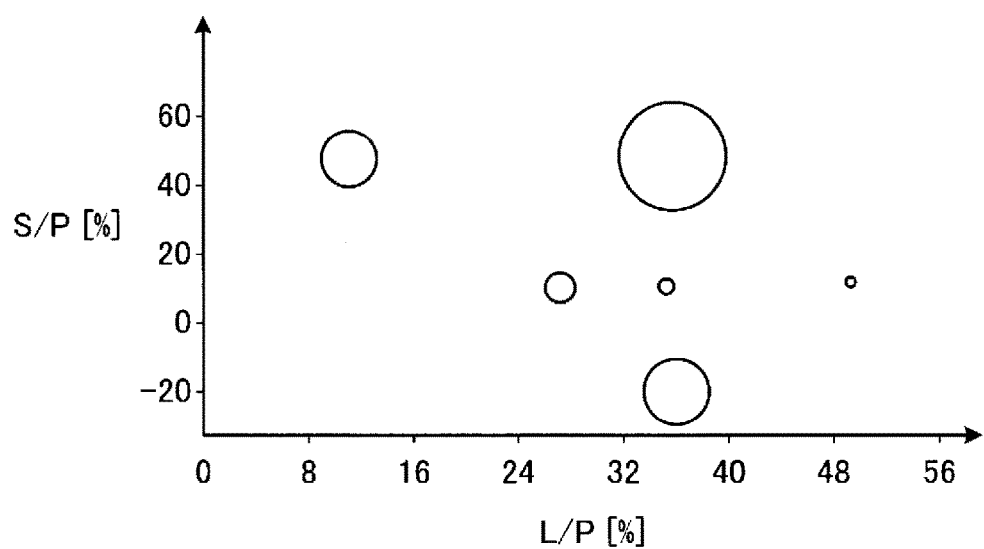
FIG. 7 is a graph illustrating the size of pressure fluctuation across the plurality of combustors.
Figure 8:
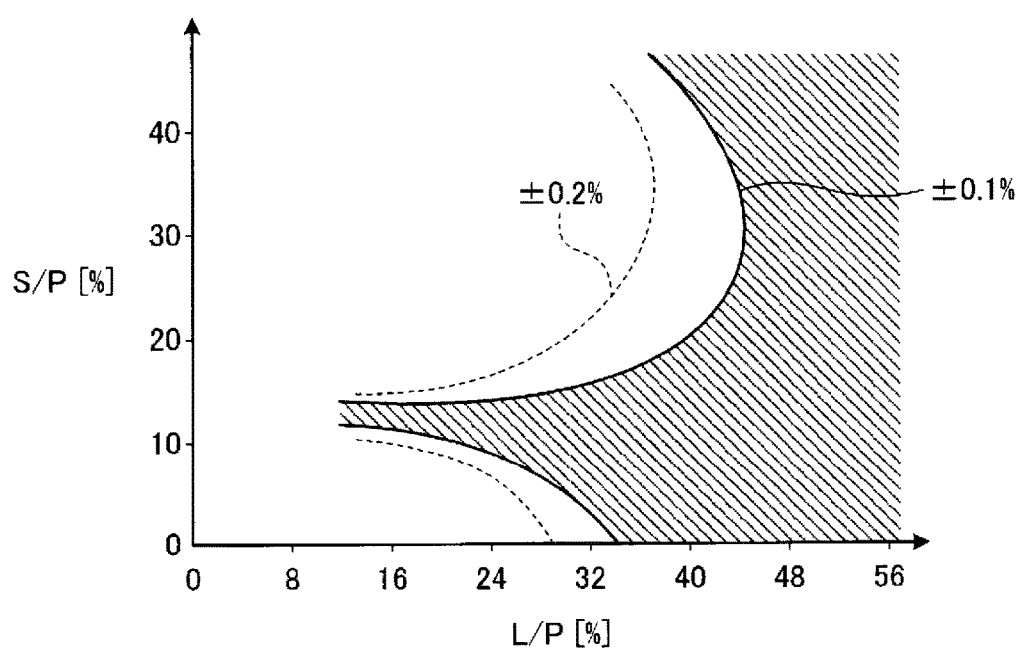
FIG. 8 is a graph illustrating the difference in flow rate across the plurality of combustors.
Figure 9:
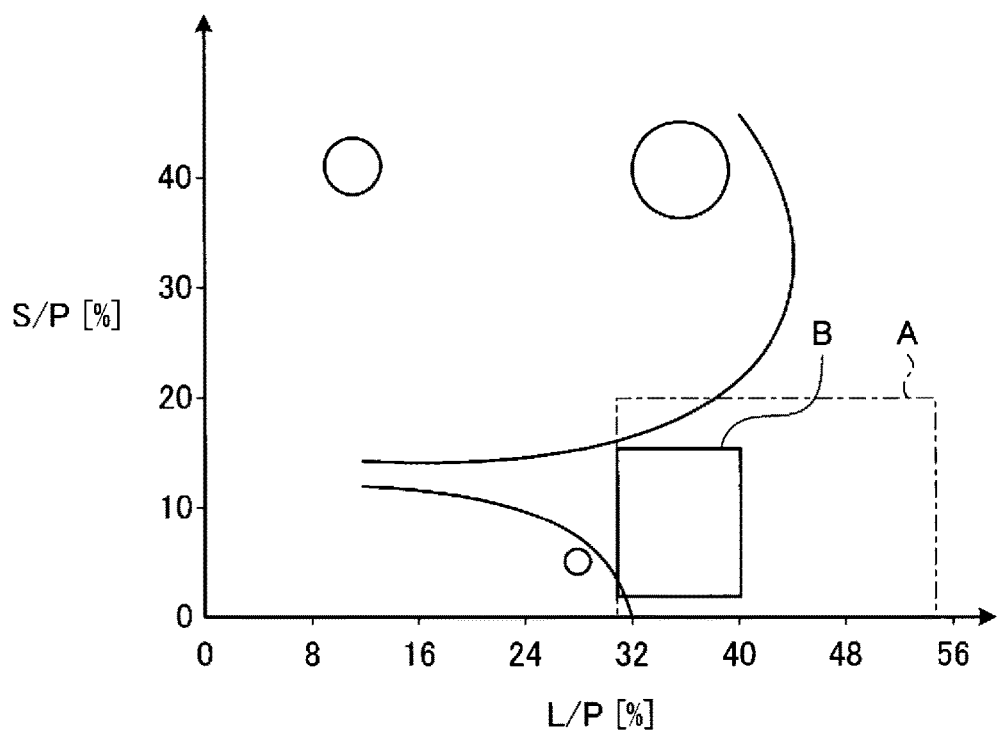
FIG. 9 is a graph illustrating regions where a major Karman vortex street does not form due to the difference in flow rate across the plurality of combustors being small.

Below, the positional relationship between the transition piece 43 of the combustor 12 and the first stage vanes 27 of the turbine 13 is described. FIG. 5 is a schematic diagram of the positional relationship between the combustor transition pieces and the first stage vanes as seen from the side of the combustor. FIG. 6 is a schematic diagram of the positional relationship between the combustor transition pieces and the first stage vanes as seen from the upstream side of the combustor. FIG. 7 is a graph showing the size of pressure fluctuation across the plurality of combustors. FIG. 8 is a graph showing the difference in flow rate across the plurality of combustors. FIG. 9 is a graph showing regions where a major Karman vortex street does not form due to the difference in flow rate across the plurality of combustors being small. Note that FIG. 6 illustrates the transition piece 43 from the upstream side. As the seal members and the like are disposed between the transition pieces 43, the inclined surfaces 64 are indicated using dotted lines.

As illustrated in FIGS. 5 and 6, a pitch dimension of the plurality of first stage vanes 27 in the circumferential direction C is taken as P. A dimension in the circumferential direction C from an intermediate point M, which is between a target transition piece 43 of a combustor 12 and a transition piece 43 of other combustor 12 neighboring the target combustor 12 to one side in the circumferential direction C, to the closest upstream end 27a of the first stage vane 27 to one side in the circumferential direction C is taken as S. The ratio of the dimension S in the circumferential direction C to the pitch dimension P in the circumferential direction C is a circumferential ratio S/P.

A dimension from the downstream end surface 43a of the transition piece 43 to the upstream end 27a of the first stage vane 27 in the axis Ac direction is taken as L. The ratio of the dimension L in the axis Ac direction to the pitch dimension P in the circumferential direction C is axial ratio L/P.

Simulations of the level of pressure fluctuation at the downstream end surfaces 43a of the transition pieces 43 of the plurality of combustors 12 and the difference in flow rate of combustion gas across the plurality of combustors 12 were performed using the circumferential ratio S/P and the axial ratio L/P. Note that in the simulation, the number Nc of combustors 12 and the number Ns of first stage vanes 27 was set to a ratio of 2:3.

In such a configuration, positions of the upstream ends 27a of the first stage vanes 27 are located aligned in the radial direction about the rotor 32. In other words, the upstream ends 27a of the first stage vanes 27 have the same position in the circumferential direction at any position in the radial direction. Accordingly, in all regions in the longitudinal direction of the first stage vanes 27, the positional relationship between the transition pieces 43 and the first stage vanes 27 is made suitable. This allows for pressure fluctuation at the rear end portions of the transition pieces 43 of the plurality of combustors 12 caused by a Karman vortex street to be suppressed and also for a difference in flow rate of the combustion gas across the plurality of combustors 12 to be suppressed.

Note that in this configuration, the positions of the upstream ends 27a of the first stage vanes 27 are aligned in the radial direction about the rotor 32. However, the positions of downstream ends 27b of the first stage vanes 27 are not required to be located aligned in the radial direction about the rotor 32 and may be offset in the circumferential direction. For example, the throat width between the plurality of first stage vanes 27 neighboring in the circumferential direction at one end and/or the other end in the radial direction of the rotor 32 may be greater than that at the intermediate portion in the radial direction. Additionally, the upstream ends 27a of the first stage vanes 27 may be set parallel with the downstream side walls 62 of the transition piece 43.

Additionally, a modified example of the present embodiment can have the following positional relationship between the transition pieces 43 and the first stage vanes 27. In cases in which it is difficult to have a suitable positional relationship between the transition pieces 43 and the first stage vanes 27 in all regions in the longitudinal direction of the first stage vanes 27, the upstream end 27a of the airfoil can be offset in the layer direction.

In other words, there may be cases in which the position of the upstream end 27a shown in the airfoil profile in the longitudinal direction of each first stage vanes 27 may be unable to be positioned in a position so that pressure fluctuation at the rear end portions of the transition pieces 43 of the combustors 12 can be suppressed. In such cases, the airfoil profile is not changed, but the position of the airfoil may be offset so that the position of the upstream end 27a of the airfoil falls within a range that satisfies a suitable positional relationship between the transition pieces 43 and the first stage vanes 27. In such a configuration, the positions of the upstream ends 27a of the first stage vanes 27 are not required to be arranged on a straight line in the radial direction of the rotor 32. In other words, the upstream ends 27a of the first stage vanes 27 are disposed to have a positional relationship such that a line that joins the upstream ends 27a in the radial direction of the rotor 32 curves.

As illustrated in FIG. 7, ○ represents a position where pressure fluctuation occurs. The size of the ○ indicates the level of the pressure fluctuation. Additionally, as illustrated in FIG. 8, the solid line is a border line when the difference in flow rate ΔQ of the combustion gas across the combustors 12 is ±0.1%. The dotted line is a border line when the difference in flow rate ΔQ of the combustion gas across the combustors 12 is ±0.2%. As a result, as illustrated in FIG. 9, a region A where the axial ratio L/P is from 0.3 (30%) to 0.55 (55%), and the circumferential ratio S/P is from 0 (0%) to 0.2 (20%) can be observed to have a low level of pressure fluctuation and a small difference in flow rate. Additionally, a region B where the axial ratio L/P is from 0.3 (30%) to 0.4 (40%), and the circumferential ratio S/P is from 0.5 (50%) to 0.15 (15%) can be observed to have a lower level of pressure fluctuation and a smaller difference in flow rate.

Figure 10:
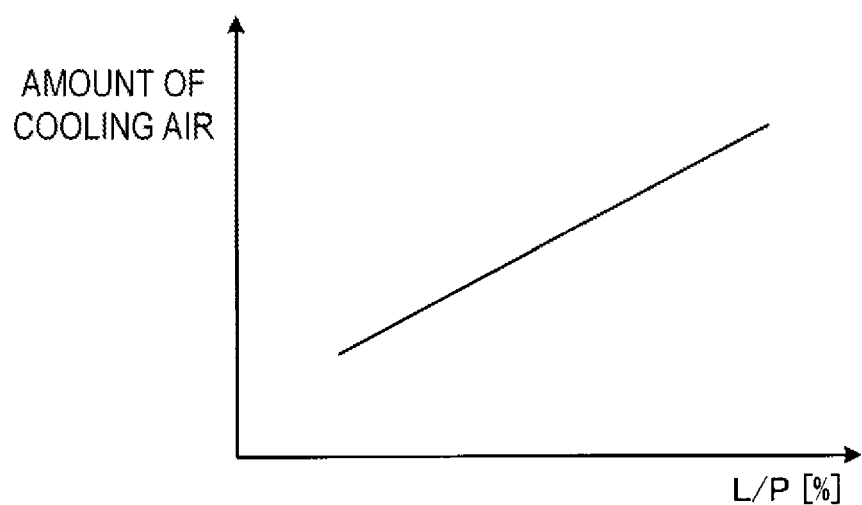
FIG. 10 is a graph of the amount of cooling air plotted against the axial ratio L/P.
Figure 11:
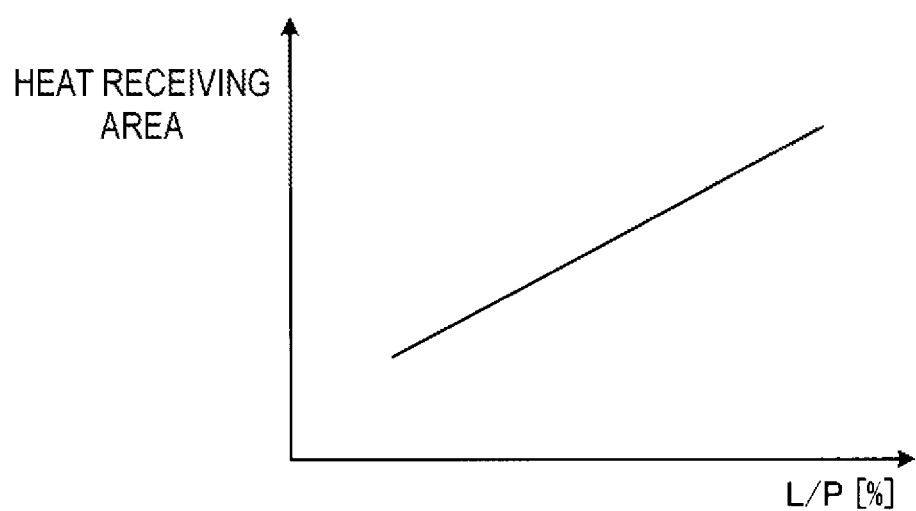
FIG. 11 is a graph of the heat receiving area plotted against the axial ratio L/P.
Figure 12:
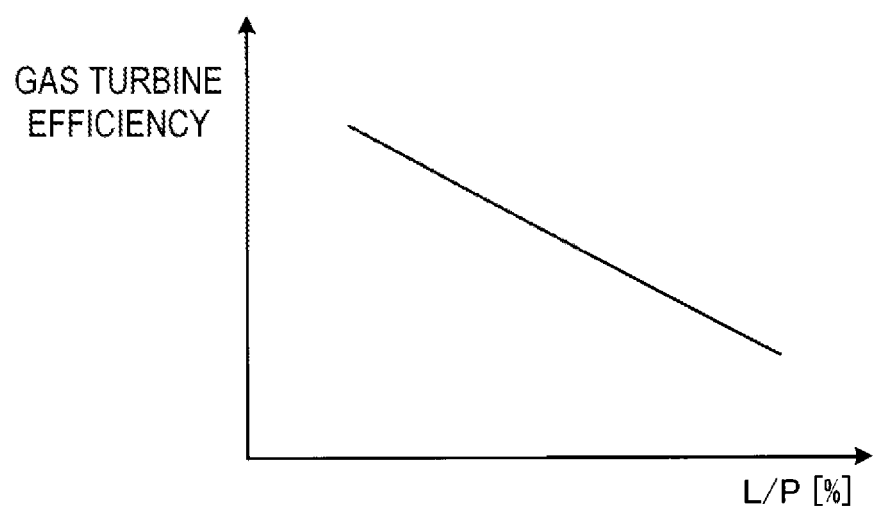
FIG. 12 is a graph of gas turbine efficiency plotted against the axial ratio L/P.

The axial ratio L/P is preferably set taking into account the amount of cooling air for the shroud supporting the first stage vanes 27 and turbine efficiency. FIG. 10 is a graph of the amount of cooling air plotted against the axial ratio L/P. FIG. 11 is a graph of the heat receiving area plotted against the axial ratio L/P. FIG. 12 is a graph of gas turbine efficiency plotted against the axial ratio L/P.

Cooling air passes through a cooling passage provided in the side walls 62 of the transition piece 43 and is released toward an inner shroud and outer shroud that support the first stage vanes 27. The axial ratio L/P is set taking into account the amount of cooling air and turbine efficiency. As illustrated in FIG. 10, by increasing the axial ratio L/P (dimension L), the amount of cooling air also increases. Additionally, as illustrated in FIG. 11, by increasing the axial ratio L/P (dimension L), the heat receiving area also increases. However, as illustrated in FIG. 12, by increasing the axial ratio L/P (dimension L), turbine efficiency decreases. Cooling air is bled from a portion of the compressed air. Thus, by reducing the amount of compressed air supplied to the combustor 12 and reducing the amount of fuel, the energy of the combustion gas decreases. Accordingly, the axial ratio L/P is preferably set taking into account the amount of cooling air for the shroud and gas turbine efficiency.

The gas turbine of the present embodiment has a configuration wherein inclined surfaces 64 are provided on inner surfaces of side walls 62 neighboring in a circumferential direction at downstream end portions of transition pieces 43 of combustors 12, the inclined surfaces 64 being configured to increase a passage area of the transition pieces 43, a ratio S/P is from 0 to 0.2, where P is a pitch dimension of first stage vanes 27 of the turbine 13, and S is a circumferential dimension from an intermediate point between neighboring transition pieces 43 to an upstream end of a first stage vane 27 closest in the circumferential direction; and a ratio L/P is from 0.3 to 0.55, where P is the pitch dimension, and L is an axial dimension from a downstream end of the transition piece 43 to the upstream end of the first stage vane 27.

With this configuration, the positional relationship between the transition pieces 43 and the first stage vanes 27 is made suitable. This allows for pressure fluctuation at the rear end portions of the transition pieces 43 of the plurality of combustors 12 caused by a Karman vortex street to be suppressed and also for a difference in flow rate of the combustion gas across the plurality of combustors 12 to be suppressed. As a result, by suppressing a difference in flow rate of combustion gas across the combustors 12, increases in NOx emissions and decreases in turbine efficiency can be suppressed.

The gas turbine according to the present embodiment may also have a configuration wherein the ratio S/P of the circumferential dimension S to the pitch dimension P is from 0.05 to 0.15; and the ratio L/P of the axial dimension L to the pitch dimension P is from 0.3 to 0.4. With this configuration, the positional relationship between the transition pieces 43 and the first stage vanes 27 is made suitable. This allows for a major Karman vortex street at the rear end portions of the transition pieces 43 of the plurality of combustors 12 to be prevented and also for a difference in flow rate of the combustion gas across the plurality of combustors 12 to be suppressed.

The gas turbine according to the present embodiment may also have a configuration wherein a ratio between the number of combustors 12 and the number of first stage vanes 27 of the turbine 13 is 2:3 or greater odd number.

The gas turbine according to the present embodiment may also have a configuration wherein the inclined surface 64 is provided at a downstream portion of the transition piece 43 on an inner surface of at least one side wall 62 of a pair of side walls 62 disposed in opposition with respect to the circumferential direction of the rotor 32, the inclined surface 64 inclining toward a neighboring transition piece 43 as it extends downstream in an axial direction of the transition piece 43 to the downstream end of the transition piece 43. With this configuration, flow along the side wall inner surfaces of neighboring transition pieces 43 merge at an angle downstream of the downstream end surfaces of the transition pieces 43. Thus, a major Karman vortex street can be prevented from forming downstream of the downstream end surfaces of the transition pieces 43, and thus pressure fluctuation at the downstream portions of the transition pieces 43 can be suppressed.

The gas turbine according to the present embodiment may also have a configuration wherein positions of the upstream ends of the first stage vanes 27 are located aligned in a radial direction about the rotor 32. Accordingly, in all regions in the longitudinal direction of the first stage vanes 27, the positional relationship between the transition pieces 43 and the first stage vanes 27 is made suitable. This allows for pressure fluctuation at the rear end portions of the transition pieces 43 of the plurality of combustors 12 caused by a Karman vortex street to be suppressed and also for a difference in flow rate of the combustion gas across the plurality of combustors 12 to be suppressed.

The gas turbine according to the present embodiment may also have a configuration wherein a throat width between first stage vanes 27 neighboring in the circumferential direction of the plurality of first stage vanes 27 is greater at one end and/or another end in the radial direction of the rotor 32 than at an intermediate portion in the radial direction. With this configuration, turbine efficiency is increased, enabling an increase in performance.

The gas turbine according to the present embodiment may also have a configuration wherein the axial ratio L/P is set taking into account an amount of cooling air for a shroud which supports the first stage vanes 27 and turbine efficiency. With this configuration, the positional relationship between the transition pieces 43 and the first stage vanes 27 can be made suitable.

REFERENCE SIGNS LIST

10 Gas turbine
11 Compressor
12 Combustor
13 Turbine
20 Air inlet port
21 Compressor casing
22 Inlet guide vane
23 Vane
24 Blade
25 Air bleed chamber
26 Turbine casing
27 Vane (first stage vane)
28 Blade
29 Exhaust casing
30 Exhaust chamber
31 Exhaust diffuser
32 Rotor
33, 34 Bearing portion
35, 36, 37 Leg portion
41 Outer cylinder
42 Inner cylinder
43 Transition piece
43a Downstream end surface
44 Pilot burner
45 Main burner
46 Bypass pipe
47 Bypass valve
51 Outer cylinder body
52 Outer cylinder cover portion
53 Fastening bolt
54 Top hat portion
55 Fastening bolt
56 Air passage
57 Supply passage
58 Pilot fuel port
59 Main fuel port
61 Trunk
62, 63 Side wall
64 Inclined surface
64a Upstream end
64b Downstream end
71 Outlet flange
72 Flange main portion
73 Opposing portion
74 Recessed portion
75 Seal member

The invention claimed is:

1. A gas turbine, comprising:
a compressor configured to compress air;
a plurality of combustors disposed in an annular configuration about a rotor, each of the combustors being configured to combust a mixture of compressed air compressed by the compressor and fuel;

a turbine configured to obtain rotational power from combustion gas produced by the combustors, the turbine having first stage vanes; and a plurality of transition pieces each arranged between a respective one of the combustors and the turbine, the transition pieces having side walls with inclined surfaces provided on inner surfaces of the side walls neighboring in a circumferential direction at downstream end portions of the transition pieces, the inclined surfaces being configured to increase a passage area of the transition pieces;

wherein the transition pieces and the turbine are configured such that a ratio S/P is in a range from 0 to 0.2, where P is a pitch dimension of the first stage vanes of the turbine, and S is a circumferential dimension from an intermediate point between neighboring transition pieces of the transition pieces to an upstream end of a first stage vane of the first stage vanes closest in the circumferential direction; and wherein the transition pieces and the turbine are further configured such that a ratio L/P is in a range from 0.3 to 0.55, where P is the pitch dimension, and L is an axial dimension from a downstream end of the transition piece to the upstream end of the first stage vane.

2. The gas turbine according to claim 1, wherein the transition pieces and the turbine are further configured such that the ratio S/P of the circumferential dimension S to the pitch dimension P is from 0.05 to 0.15, and the ratio L/P of the axial dimension L to the pitch dimension P is from 0.3 to 0.4.

3. The gas turbine according to claim 1, wherein the transition pieces and the turbine are further configured such that a ratio between the number of combustors and the number of first stage vanes is 2:3 or greater.

4. The gas turbine according to claim 1, wherein the transition pieces are further configured such that the inclined surface is provided at a downstream end portion of the transition piece on an inner surface of at least one side wall of a pair of the side walls disposed in opposition with respect to the circumferential direction of the rotor, the inclined surface inclining toward a neighboring transition piece as it extends downstream in an axial direction of the transition piece to the downstream end of the transition piece.

5. The gas turbine according to claim 1, wherein the turbine is configured such that positions of the upstream ends of the first stage vanes are located aligned in a radial direction about the rotor.

6. The gas turbine according to claim 1, wherein the transition pieces and the turbine are further configured such that the ratio L/P is set taking into account an amount of cooling air for a shroud which supports the first stage vanes and turbine efficiency.

* * * * *